US008560650B2

(12) United States Patent
Yu et al.

(10) Patent No.: US 8,560,650 B2
(45) Date of Patent: Oct. 15, 2013

(54) NETWORK DEVICE AND METHOD FOR SETTING PARAMETERS OF THE NETWORK DEVICE

(75) Inventors: Cheng-Chun Yu, Taipei-Hsien (TW); Chih-Yuan Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 12/908,008

(22) Filed: Oct. 20, 2010

(65) Prior Publication Data

US 2012/0054776 A1    Mar. 1, 2012

(30) Foreign Application Priority Data

Aug. 26, 2010 (CN) .......................... 2010 1 0263669

(51) Int. Cl.
*G06F 15/177* (2006.01)
(52) U.S. Cl.
USPC ............ 709/222; 709/220; 709/221; 719/317

(58) Field of Classification Search
USPC .................................. 709/220–222; 719/317
See application file for complete search history.

(56) References Cited

U.S. PATENT DOCUMENTS

| 6,944,631 B2 * | 9/2005 | Peter ..................................... 1/1 |
| 2002/0184300 A1 * | 12/2002 | Schmeling et al. ............ 709/202 |
| 2008/0215728 A1 * | 9/2008 | Li et al. .......................... 709/224 |
| 2012/0047118 A1 * | 2/2012 | Lu et al. ......................... 707/704 |
| 2012/0084412 A1 * | 4/2012 | Burns et al. ................... 709/221 |

\* cited by examiner

*Primary Examiner* — Mohamed Wasel
(74) *Attorney, Agent, or Firm* — Altis & Wispro Law Group, Inc.

(57) ABSTRACT

A network device and method for setting parameters of the network device provides a management agent to receive parameters input by a user. The parameters corresponds to one or more service agents of the network device. The management agent sends the corresponding parameters to the one or more service agents. The service agent sends all the parameters to a corresponding driver of the network device upon the condition that the service agent has received all the parameters. The driver sets the received parameters to enable functions of the network device.

18 Claims, 3 Drawing Sheets

NETWORK DEVICE AND METHOD FOR SETTING PARAMETERS OF THE NETWORK DEVICE

BACKGROUND

1. Technical Field

Embodiments of the present disclosure relate to methods for setting parameters of network devices, and more particularly, to a network device and a method for setting parameters of the network device.

2. Description of related art

A network device may include a management agent, a number of service agents, a management layer service system and a driver corresponding to each service agent. If a user wants to set parameters for the network device, the management agent should send parameters input by the user to the management layer service system. Then the management layer service system sends the parameters to the service agents. Each service agent sends the parameters to the corresponding driver. Then the driver sets the received parameters to the network device.

At present, the service agent sends parameters to the corresponding driver one by one. The corresponding driver sets the parameters to the network device one by one. The parameters of the network device needs to be set numerous times, which is time-consuming.

DETAILED DESCRIPTION

The disclosure is illustrated by way of examples and not by way of limitation in the fingers of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
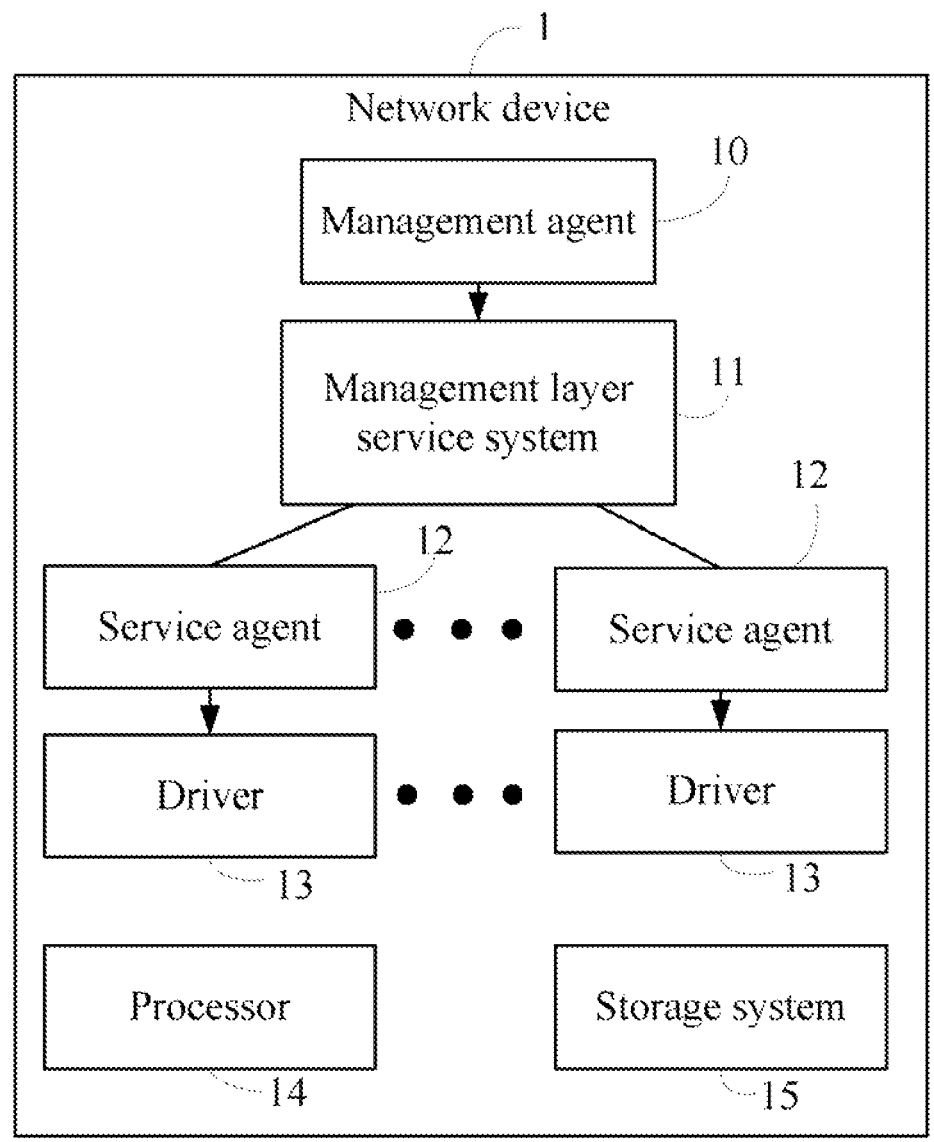
FIG. 1 is a block diagram of one embodiment of a network device including a management layer service system.

FIG. 1 is a block diagram of one embodiment of a network device 1. In one embodiment, the network device 1 includes a management agent (MA) 10, a management layer service (MLS) system 11, a plurality of service agents (SAs) 12 with a corresponding driver 13, a processor 14, and a storage system 15. The MA 10 is an interface provided for setting parameters of the network device 1. In one embodiment, the parameters may be firewall parameters. The MA 10 may be a web page for inputting commands. The SAs 12 may be a firewall of the network device 1. The driver 13 may be a firewall driver to set the firewall parameters of the network device 1.

Each SA 12 corresponds to one or more parameters input by the MA 10. The MLS system 11 is a middleware connecting software components or applications to allow multiple processes running on the network device 1. The MLS system 11 receives the parameters and stores the parameters in the storage system 15.

Each SA 12 is registered on the MLS system 11. In some embodiments, dependent relations between the SAs 12 are stored in the MLS system 11. The MLS system 11 sends corresponding parameters to the SAs 12 according to the dependent relations. For example, if a second SA 12 is dependent on a first SA 12, the MLS system 11 sends corresponding parameters to the first SA 12 firstly, and then sends corresponding parameters to the second SA 12.

Each SA 12 sends the received corresponding parameters to the corresponding driver 13. The driver 13 then sets the corresponding parameters to the network device 1. In some embodiments, a function of the network device 1 is enabled upon the condition that the driver 13 sets the corresponding parameters.

One or more computerized codes of the MLS system 11 are stored in the storage system 15, where the processor 14 executes the one or computerized codes, to provide one or more aforementioned operations of the MLS system 11. The storage system 15 stores one or more programs, such as those of an operating system, other applications, and various data.

Figure 2:
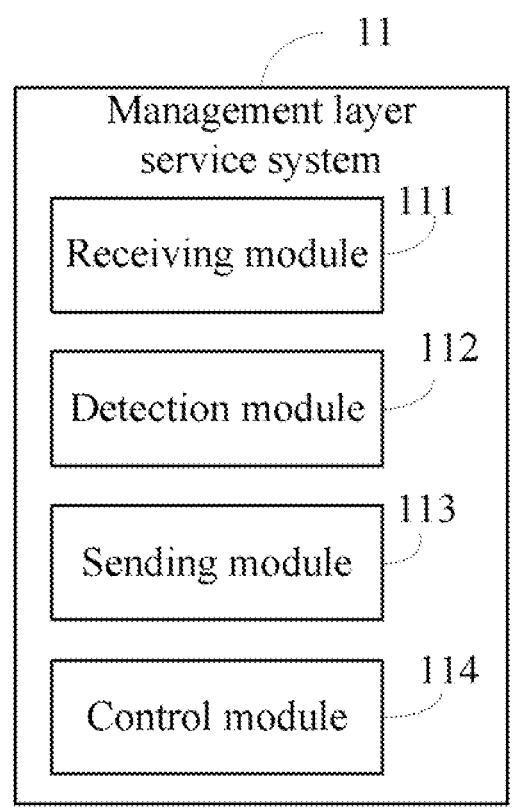
FIG. 2 is a block diagram of one embodiment of the management layer service system in FIG. 1.

As shown in FIG. 2, the MLS system 11 may include a receiving module 111, a detection module 112, a sending module 113, and a control module 114. Each of the modules 111-114 may be a software program including one or more computerized instructions that are stored in the storage system 15 and executed by the processor 14.

The receiving module 111 receives parameters from the MA 10 and stores the parameters into the storage system 15. In some embodiments, the parameters may relate to one SA 12 or more than one SA 12.

The detection module 112 detects if all the parameters correspond to only one SA 12. If all the parameters correspond to the only one SA 12, the sending module 113 sends all the parameters to the only one SA 12. If all of the parameters correspond to more than one SA 12, the sending module 113 determines a parameter receiving sequence of the SAs 12 according to the dependent relations of the SAs 12.

The SAs 12 are divided to a plurality of groups according to the parameter receiving sequence. In some embodiments, the SAs 12 are divided to a first group and a second group. The SAs 12 of a first group receive corresponding parameters at first. The SAs 12 of the first group are defined as members of the first group. The SAs 12 depending on the members of the first group belongs to a second group. The sending module 113 also determines members of the first group to receive corresponding parameters according to the parameter receiving sequence, and sends the corresponding parameters to the members of the first group. For example, if the second SA 12 depends on the first SA 12, the sending module 113 determines that the first SA 12 is the member of the first group, and the second SA 12 is the member of the second group.

In some embodiments, before the corresponding parameters are sent to a SA 12, the sending module 12 sends a start flag to the SA 12. The start flag instructs the SA 12 to receive the parameters from the MLS system 11. For example, the sending module 12 sends the start flag "NotYetApplied=true" to the SA 12. The detection module 112 detects if the sending module 113 has sent all the corresponding parameters to a SA 12. If the sending module 113 has sent all the corresponding parameters to the SA 12, the sending module 113 further sends an end flag to the SA 12. The end flag informs the SA 12 that all the parameters corresponding to the SA 12 have been sent. For example, the sending module 113 sends the end flag "NotYetApplied=false" to the SA 12.

The control module system 114 controls each SA 12 to send the received corresponding parameters to the corresponding driver 13, and controls the corresponding driver 13 to set the corresponding parameters of the network device 1.

Figure 3:
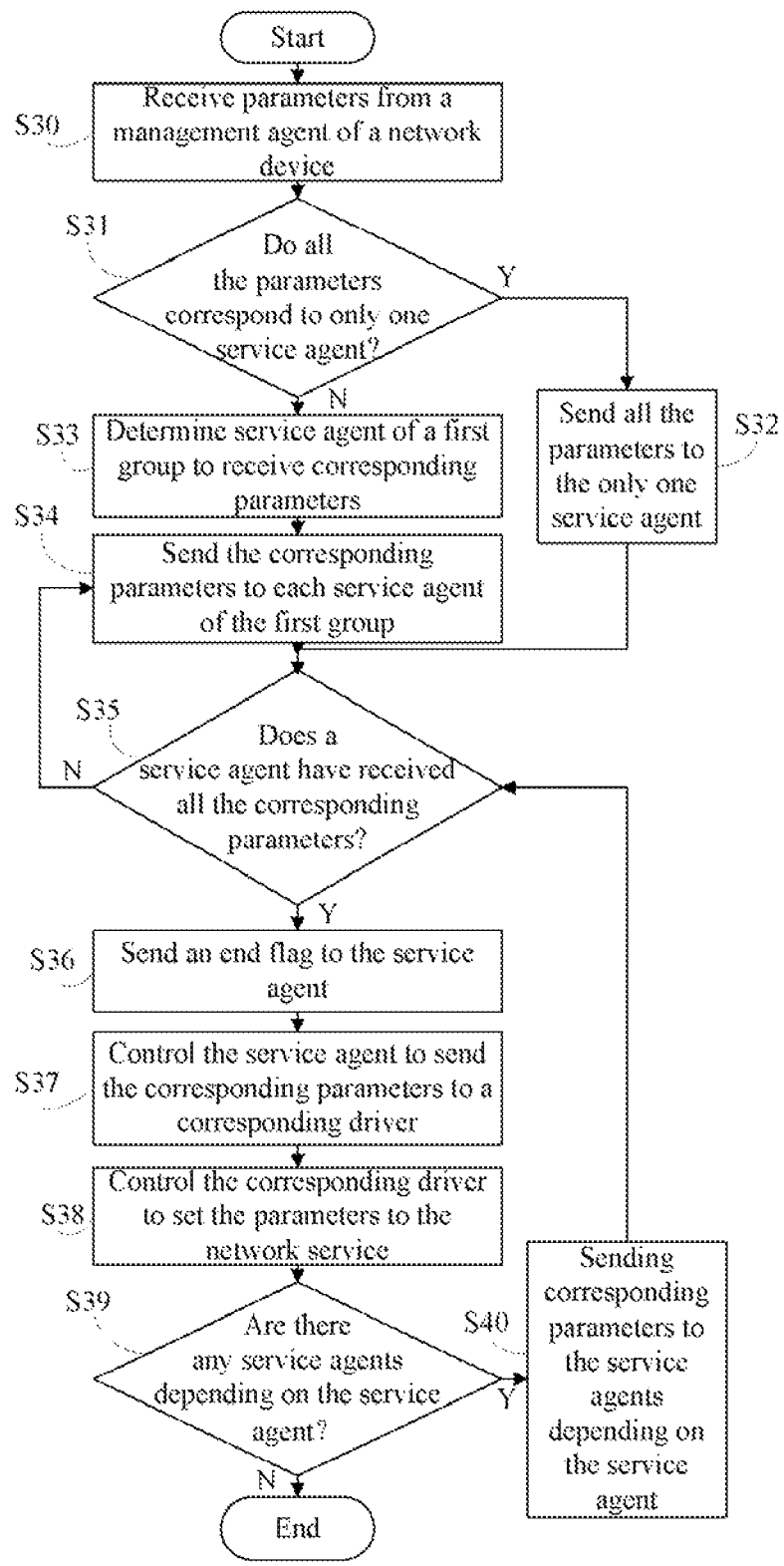
FIG. 3 is a flowchart of one embodiment of a method for setting parameters of the network device.

FIG. 3 is a flowchart of one embodiment of a method for setting parameters of the network device 1. Depending on the embodiment, additional blocks may be added, others removed, and the ordering of the blocks may be changed.

In block S30, the receiving module system 111 receives parameters from the MA 10 and stores the parameters in the storage system 15.

In block S31, the detection module system 112 detects if all the parameters correspond to only one SA 12. If all the parameters correspond to the only one SA 12, in block S32, the sending module 113 sends all the parameters to the only one SA 12.

If all the parameters correspond to more than one SA 12, in block S33, the sending module system 113 determines a parameter receiving sequence of the SAs 12 according to the dependent relations of the SAs 12, and determines the members of a first group according to the parameter receiving sequence.

In block S34, the sending module system 113 sends the corresponding parameters to each SA 12 of the first group. In some embodiments, the sending module system 113 sends a start flag to each SA 12 of the first group before the corresponding parameters are sent to each SA 12.

In block S35, the detection module 112 detects if there is a SA 12 of the first group that has received all the corresponding parameters. If there is a SA 12 of the first group that has received all the corresponding parameters, block S36 is implemented. If there is no SA 12 of the first group has received all the corresponding parameters, block S34 is repeated.

In block S36, the sending module system 113 sends an end flag to the SA 12.

In block S37, the control module system 114 controls the SA 12 to send all the received corresponding parameters to the corresponding driver 13.

In block S38, the corresponding driver 13 sets the parameters to the network device 1.

In block S39, the detection module system 112 detects if there are any other SAs 12 depending on the SA 12. If there are other SAs 12 depending on the SA 12, block S40 is implemented. If there are no other SAs 12 depending on the SA 12, the procedure ends.

In block S40, the sending module system 113 sends corresponding parameters to the other SAs 12 depending on the SA 12, and block S35 is implemented.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A network device, comprising:
   a management agent;
   a plurality of service agents with a corresponding driver;
   a storage system;
   at least one processor; and
   a management layer service system being stored in the storage system and executable by the at least one processor, the management layer service system comprising:
   a receiving module operable to receive parameters from the management agent;
   a sending module operable to determine a parameter receiving sequence of the plurality of the service agents, and send corresponding parameters to the service agents according to the parameter receiving sequence; and
   a control module operable to control the service agent to send all the corresponding parameters to the corresponding driver of the service agent upon the condition that the service agent has received all the corresponding parameters, and the corresponding driver operable to set the parameters to the network device.

2. The network device as claimed in claim 1, wherein management agent stores dependent relations between the plurality of service agents.

3. The network device as claimed in claim 1, wherein the sending module is further operable to send a start flag to the service agent before the management agent sends the corresponding parameters to the service agent.

4. The network device as claimed in claim 1, wherein the sending module is further operable to send corresponding parameters to the service agents upon the condition that the service agent has received all the corresponding parameters.

5. The network device as claimed in claim 1, the sending module is further operable to send an end flag to the service agent upon the condition that the sending module has sent all the corresponding parameters to the service agent.

6. The network device as claimed in claim 1, wherein the management layer service system further comprises a detection module operable to detect if all the parameters correspond to only one service agent.

7. A method for setting parameters of the network device, comprising:
   receiving parameters from a management agent of the network device;
   determining a parameter receiving sequence of a plurality of service agents of the network device;
   sending corresponding parameters to the service agents according to the parameter receiving sequence; and
   controlling the service agent to send all the corresponding parameters to a corresponding driver of the service agent upon the condition that the service agent has received all the corresponding parameters, and controlling the corresponding driver to set the parameters in the network device.

8. The method as claimed in claim 7, wherein the management agent stores dependent relations between the plurality of service agents.

9. The method as claimed in claim 7, before the sending block, the method further comprising:
   sending a start flag to the service agent before the management agent sends the corresponding parameters to the service agent.

10. The method as claimed in claim 7, further comprising:
    sending an end flag to the service agent upon the condition that the service agent has received all the corresponding parameters.

11. The method as claimed in claim 7, further comprising:
    detecting if the service agents dependent on the service agent has received all the corresponding parameters; and
    sending the corresponding parameters to the service agents if the service agents depend on the service agent that has received all the corresponding parameters.

12. The method as claimed in claim 7, after the sending block further comprising:
  detecting if all the parameters correspond to only one service agent; and
  sending all the parameters to the only one service agent upon the condition that the parameters correspond to the only one service agent.

13. A non-transitory storage medium storing a set of instructions, the set of instructions capable of being executed by a processor to perform a method for setting parameters of the network device, the method comprising:
  receiving parameters from a management agent of the network device;
  determining a parameter receiving sequence of a plurality of service agents of the network device;
  sending corresponding parameters to the service agents according to the parameter receiving sequence; and
  controlling the service agent to send all the corresponding parameters to a corresponding driver of the service agent upon the condition that the service agent has received all the corresponding parameters, and controlling the corresponding driver to set the parameters in the network device.

14. The non-transitory storage medium as claimed in claim 13, wherein the management agent stores dependent relations between the plurality of service agents.

15. The non-transitory storage medium as claimed in claim 13, before the sending block, the storage medium further comprising: sending a start flag to the service agent before the management agent sends the corresponding parameters to the service agent.

16. The non-transitory storage medium as claimed in claim 13, further comprising: sending an end flag to the service agent upon the condition that the service agent has received all the corresponding parameters.

17. The non-transitory storage medium as claimed in claim 13, further comprising:
  detecting if the service agents dependent on the service agent has received all the corresponding parameters; and
  sending the corresponding parameters to the service agents if the service agents depend on the service agent that has received all the corresponding parameters.

18. The non-transitory storage medium as claimed in claim 13, after the sending block further comprising:
  detecting if all the parameters correspond to only one service agent; and
  sending all the parameters to the only one service agent upon the condition that the parameters correspond to the only one service agent.

* * * * *